United States Patent
Ito et al.

(10) Patent No.: US 8,519,652 B2
(45) Date of Patent: Aug. 27, 2013

(54) CONTROL APPARATUS FOR ELECTRIC ROTATING MACHINE

(75) Inventors: Masato Ito, Tokyo (JP); Yoshihiko Kimpara, Tokyo (JP); Toshiyuki Kaitani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 221 days.

(21) Appl. No.: 13/201,228

(22) PCT Filed: Mar. 25, 2009

(86) PCT No.: PCT/JP2009/001330
§ 371 (c)(1),
(2), (4) Date: Aug. 12, 2011

(87) PCT Pub. No.: WO2010/109522
PCT Pub. Date: Sep. 30, 2010

(65) Prior Publication Data
US 2011/0291601 A1 Dec. 1, 2011

(51) Int. Cl.
*H02P 6/16* (2006.01)
(52) U.S. Cl.
USPC ............ 318/400.23; 318/400.01; 318/400.02; 318/700; 318/727
(58) Field of Classification Search
USPC ................. 318/400.23, 700, 400.01, 400.02, 318/727
See application file for complete search history.

(56) References Cited

U.S. PATENT DOCUMENTS

| | | | |
|---|---|---|---|
| 5,559,419 A * | 9/1996 | Jansen et al. | 318/808 |
| 5,565,752 A * | 10/1996 | Jansen et al. | 318/807 |
| 5,585,709 A * | 12/1996 | Jansen et al. | 318/807 |
| 6,396,229 B1 * | 5/2002 | Sakamoto et al. | 318/400.02 |
| 6,462,491 B1 * | 10/2002 | Iijima et al. | 318/400.34 |
| 6,462,492 B1 * | 10/2002 | Sakamoto et al. | 318/400.32 |
| 6,531,843 B2 * | 3/2003 | Iwaji et al. | 318/727 |
| 6,577,096 B2 * | 6/2003 | Cho | 318/727 |
| 6,628,099 B2 * | 9/2003 | Iwaji et al. | 318/700 |
| 7,045,988 B2 * | 5/2006 | Ha et al. | 318/807 |
| 7,084,603 B2 | 8/2006 | Taguchi et al. | |

(Continued)

FOREIGN PATENT DOCUMENTS

JP  4 54872  2/1992
JP  2001-25279 A  1/2001

(Continued)

OTHER PUBLICATIONS

U.S. Appl. No. 13/203,069, filed Aug. 24, 2011, Ito et al.

(Continued)

*Primary Examiner* — Rita Leykin
(74) *Attorney, Agent, or Firm* — Oblon, Spivak, McClelland, Maier & Neustadt, L.L.P.

(57) ABSTRACT

A controller outputting a voltage instruction for drive control to a electric rotating machine includes a drive voltage instruction calculation section calculating drive voltage instructions for driving the electric rotating machine, a position estimation voltage generator generating position estimation voltage instructions for position estimation about the electric rotating machine, a noise reduction voltage generator generating noise reduction voltage instructions for reducing noise occurring from the electric rotating machine along with input of the position estimation voltage instructions to the electric rotating machine, and adders outputting, to a voltage application means, a voltage instruction obtained by adding the position estimation voltage instructions and the noise reduction voltage instructions to the drive voltage instructions.

8 Claims, 13 Drawing Sheets

(56) References Cited

U.S. PATENT DOCUMENTS

| | | | | |
|---|---|---|---|---|
| 7,157,876 B2 * | 1/2007 | Ide et al. | .................. | 318/400.04 |
| 8,350,507 B2 * | 1/2013 | Ito et al. | .................. | 318/400.13 |
| 2010/0194319 A1 | 8/2010 | Ito et al. | | |

FOREIGN PATENT DOCUMENTS

| | | |
|---|---|---|
| JP | 2004 343833 | 12/2004 |
| JP | 2005 151640 | 6/2005 |
| JP | 2006 14496 | 1/2006 |
| JP | 2007 325406 | 12/2007 |

OTHER PUBLICATIONS

U.S. Appl. No. 13/255,738, filed Sep. 9, 2011, Kimpara et al.

Korean Office Action issued Oct. 29, 2012 in Patent Application No. 10-2011-7022282 with partial English Translation.

International Search Report issued Jun. 23, 2009 in PCT/JP09/001330 filed Mar. 25, 2009.

* cited by examiner

CONTROL APPARATUS FOR ELECTRIC ROTATING MACHINE

TECHNICAL FIELD

The present invention relates to a control apparatus for an electric rotating machine such as an induction machine or a synchronous machine, that is capable of obtaining rotor position information without using a rotational position sensor, and performing rotation control for the electric rotating machine.

BACKGROUND ART

In order to accurately control a rotational operation of an electric rotating machine, rotor position information of the electric rotating machine and information about a current flowing in the electric rotating machine are needed. Here, conventionally, the rotor position information is obtained by additionally attaching a rotational position sensor to the rotary electric machine. However, the additional provision of a rotational position sensor has a significant disadvantage in view of cost reduction, space reduction, improvement of reliability. Therefore, change from rotational position sensor style to sensorless style has been required.

Examples of control methods for changing the electric rotating machine from rotational position sensor style to sensorless style include a method of estimating the position of a rotor of the electric rotating machine mainly from an inductive voltage of the electric rotating machine, and a method of estimating the position of the rotor of the electric rotating machine by using saliency (positional dependence of inductance) of the electric rotating machine.

The inductive voltage which is used in the former method has a characteristic that the magnitude thereof is proportional to the speed of the electric rotating machine. Therefore, at a zero speed or a low speed, the inductive voltage decreases and an S/N ratio is deteriorated. As a result, it becomes difficult to accurately estimate the position of the rotor of the electric rotating machine.

On the other hand, in the latter method which uses saliency, a high-frequency position estimation voltage instruction having a frequency different from a drive frequency of the electric rotating machine is applied to the electric rotating machine, a high-frequency electric rotating machine current flowing in the electric rotating machine along with the application of the position estimation voltage instruction is detected, and the position of the rotor is estimated by using the fact that the magnitude of the electric rotating machine current varies depending on the position of the rotor owing to the saliency.

Thus, the method using saliency has an advantage that the position of the rotor of the electric rotating machine can be estimated without depending on the rotational speed of the electric rotating machine, though the position estimation voltage instruction for estimating the position of the rotor of the electric rotating machine needs to be inputted to the electric rotating machine. Therefore, especially at a zero speed or a low speed, a position sensorless control method using saliency is used.

However, in such a position sensorless control method using saliency, since the high-frequency position estimation voltage instruction needs to be applied to the electric rotating machine, noise occurs along with the application, and the noise gives a sense of discomfort to a person.

As a measure for reducing such a sense of discomfort due to the noise occurring along with the application of the position estimation voltage to the electric rotating machine, conventionally, a method of reducing the magnitude of the noise occurring from the electric rotating machine by reducing the amplitude of the position estimation voltage applied to the electric rotating machine, and a method of improving the sound quality of the noise, have been proposed.

In the former method of reducing the magnitude of the noise occurring from the electric rotating machine by reducing the amplitude of the position estimation voltage instruction applied to the electric rotating machine, since the amplitude of the position estimation voltage instruction is small, it is difficult to accurately estimate the position of the rotor of the electric rotating machine.

On the other hand, in the latter method of improving the sound quality of the noise, for example, as in a conventional technique disclosed in Patent Literature 1, the frequency of the position estimation voltage instruction applied to the electric rotating machine is intentionally varied in a random manner so that a sound having a particular frequency component is not conspicuous, whereby a sense of discomfort that a person feels is reduced, because when a sound having a particular frequency component is conspicuous among sounds that a person can hear, the person feels a sense of discomfort from that sound.

Patent Literature 1: Japanese Laid-Open Patent Publication No. 2004-343833

DISCLOSURE OF THE INVENTION

Problems to be Solved by the Invention

However, if the frequency component of the position estimation voltage instruction is varied in a random manner as in Patent Literature 1 so that a sound having a particular frequency component is not conspicuous, along with this, the frequency of a current needed for estimating the position of the rotor of the electric rotating machine also becomes random. Therefore, it becomes difficult to detect, from an electric rotating machine current, the current needed for estimating the position of the rotor. As a result, the accuracy of estimation of the position is deteriorated, and in some cases, there is a possibility that the position cannot be estimated.

The present invention has been made for solving the above problems. An object of the present invention is to provide a control apparatus, for the electric rotating machine, that is capable of accurately estimating the position of a rotor of the electric rotating machine, and effectively reducing a sense of discomfort due to the noise occurring along with the application of the position estimation voltage instruction to the electric rotating machine.

Means of Solution to the Problems

A control apparatus for an electric rotating machine, according to the present invention, performs drive control of the electric rotating machine. The control apparatus comprises current detection means for detecting electric rotating machine currents flowing in the electric rotating machine, position estimation means for estimating the position of a rotor of the electric rotating machine based on the electric rotating machine current detected by the current detection means, control means for outputting voltage instructions based on the electric rotating machine current detected by the current detection means and information about the position of the rotor estimated by the position estimation means, and voltage application means for applying a voltage for drive control, to the electric rotating machine, based on the voltage instruction outputted from the control means. The control means includes a drive voltage instruction calculation section for calculating drive voltage instructions for driving the electric rotating machine, a position estimation voltage generator for outputting position estimation voltage instructions for estimating the position of the rotor of the electric rotating machine, a noise reduction voltage generator for outputting noise reduction voltage instructions which does not contribute to drive control and position estimation for the electric rotating machine, and adders for adding the position estimation voltage instructions and the noise reduction voltage instructions to the drive voltage instructions, and outputting the resultant signal as the voltage instructions to the voltage application means.

Effect of the Invention

According to the present invention, when the position estimation voltage instructions for position estimation about the rotor are added to the drive voltage instructions for drive control of the electric rotating machine to be outputted to the voltage application means, the noise reduction voltage instructions outputted from the noise reduction voltage generator are also added. Therefore, noise including a plurality of frequency components occurs from the electric rotating machine. Therefore, noise occurring along with the application of the position estimation voltage instructions to the electric rotating machine can be suppressed so as not to be conspicuous. As a result, a sense of discomfort that a person feels from the noise can be reduced.

In this case, the frequency of the position estimation voltage instruction is not varied in a random manner, but is set to be constant. Therefore, it becomes easy to detect a current needed for estimating the position of the rotor of the electric rotating machine, in comparison with the case where the frequency of the position estimation voltage instruction is varied in a random manner as in the conventional technique. As a result, a high accuracy of position estimation is ensured.

BEST MODE FOR CARRYING OUT THE INVENTION

Embodiment 1

Figure 1:
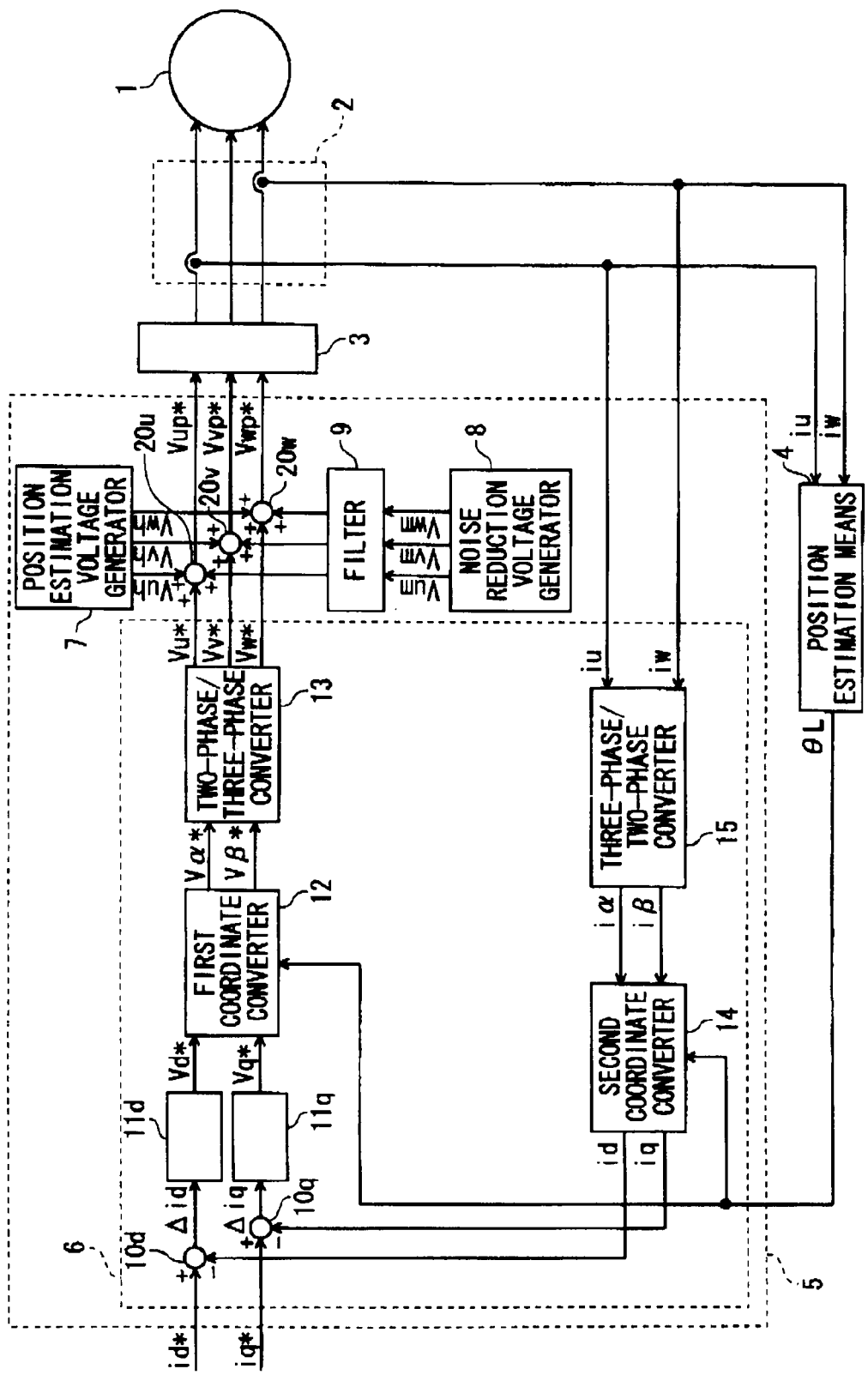
FIG. 1 is a diagram showing the configuration of a control apparatus for an electric rotating machine, according to embodiment 1 of the present invention.

FIG. 1 is a diagram showing a configuration of a control apparatus for an electric rotating machine, according to embodiment 1 of the present invention.

In embodiment 1, the electric rotating machine 1 is, for example, a synchronous machine of embedded-magnet type. A voltage application means 3 for applying a predetermined control voltage is connected to the electric rotating machine 1. In addition, there are provided: a current detection means 2 for detecting electric rotating machine currents (for two phases, in the present embodiment) iu and iw flowing between the voltage application means 3 and the electric rotating machine 1; a position estimation means 4 for estimating a rotor position $\theta L$ of the electric rotating machine 1, based on the electric rotating machine currents iu and iw detected by the current detection means 2; and a control means 5 for outputting voltage instructions Vup*, Vvp*, and Vwp* for drive control, to the voltage application means 3.

The current detection means 2 includes a current transformer and the like, for example. In the present embodiment, the current detection means 2 detects two phases of electric rotating machine currents, that is, the U-phase and W-phase electric rotating machine currents iu and iw, among three phases of electric rotating machine currents flowing between the electric rotating machine 1 and the voltage application means 3. It is noted that the V-phase electric rotating machine current iv is calculated by using the fact that the electric rotating machine currents are in three-phase equilibrium. In addition, although in the present embodiment, the U-phase and W-phase electric rotating machine currents iu and iw are detected, the present invention is not limited thereto. The electric rotating machine currents of any two phases may be detected, or U-phase, V-phase, and W-phase electric rotating machine currents iu, iv, and iw may all be detected at the same time. Alternatively, the current detection means 2 may detect a DC bus current inputted to the voltage application means 3 and calculate the electric rotating machine currents from the DC bus current.

For example, a power conversion apparatus such as a triangular wave comparison PWM inverter is applied to the voltage application means 3. The voltage application means 3 performs power conversion, based on each of the voltage instructions Vup*, Vvp*, and Vwp* outputted from the control means 5, and applies a voltage for drive control, to the electric rotating machine 1.

Here, the electric rotating machine 1 has so-called saliency in which the inductance varies in accordance with the position of the rotor. Therefore, as described in detail later, when a voltage is applied to the electric rotating machine 1 by the voltage application means 3 based on voltage instructions Vup*, Vvp*, and Vwp*, on which three-phase AC position estimation voltage instructions Vuh, Vvh, and Vwh outputted from a position estimation voltage generator 7 of the control means 5 have been superimposed, the electric rotating machine currents iu, iv, and iw detected by the current detection means 2 include currents (hereinafter, referred to as position estimation currents) iuh, ivh, and iwh having the same frequency components as those of the position estimation voltage instructions Vuh, Vvh, and Vwh, respectively, and the amplitudes of the position estimation currents iuh, ivh, and iwh vary in accordance with the position of the rotor of the electric rotating machine 1.

By using the saliency described above, first, the position estimation means 4 extracts the position estimation currents iuh, ivh, and iwh having the same frequency components as those of the position estimation voltage instructions Vuh, Vvh, and Vwh, from the electric rotating machine currents iu and iw detected by the current detection means 2. Next, the position estimation means 4 calculates an estimated rotor position (hereinafter, also referred to as an estimated position) θL of the electric rotating machine 1, based on the amplitudes of the extracted position estimation currents iuh, ivh, and iwh, and outputs the rotor position θL.

Figure 2:
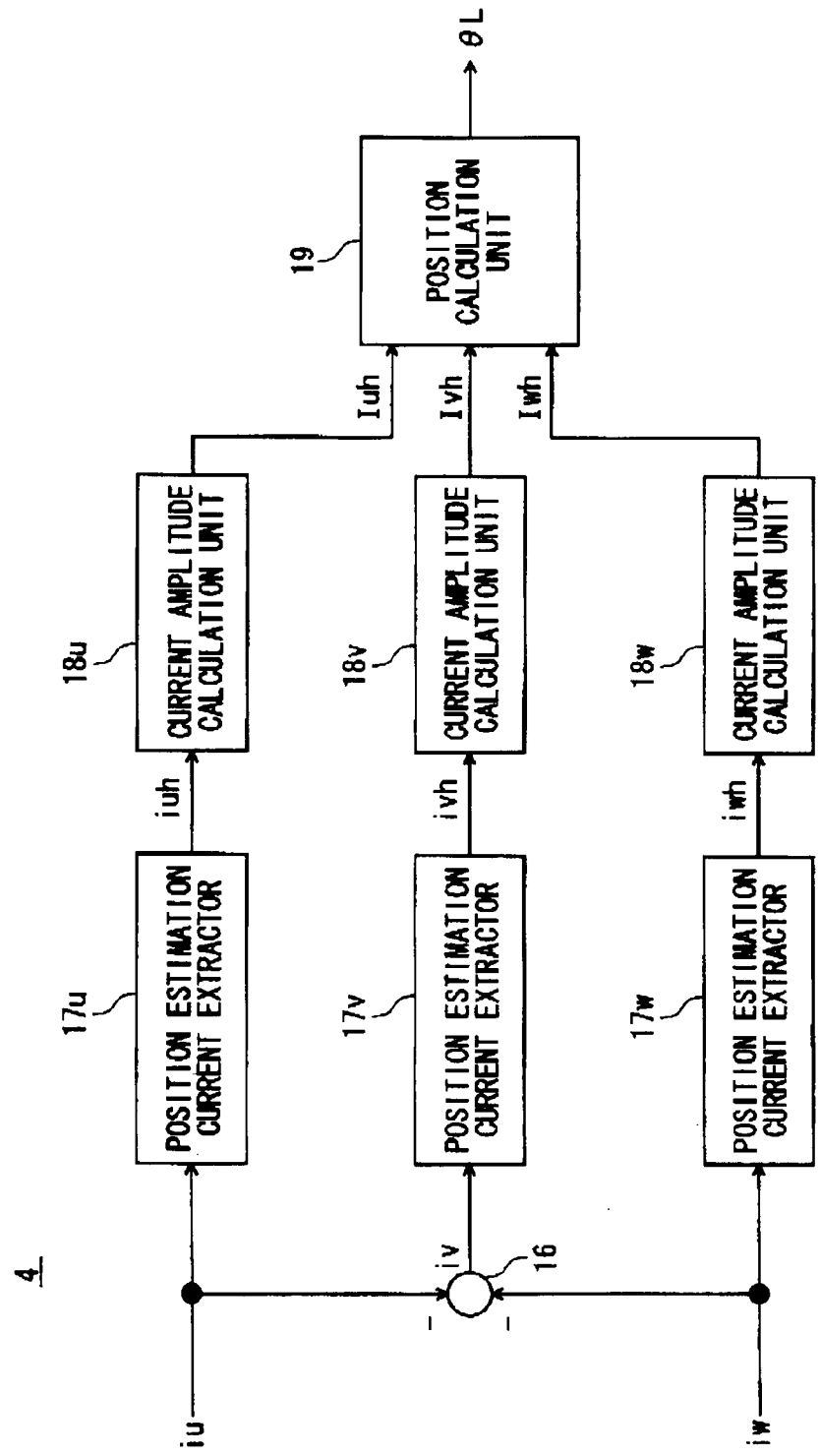
FIG. 2 is a diagram showing a specific example of the configuration of a position estimation means of the control apparatus.

FIG. 2 is a diagram showing a specific example of a configuration of the position estimation means 4.

The position estimation means 4 includes an adder 16, position estimation current extractors 17u, 17v, and 17w, current amplitude calculation units 18u, 18v, and 18w, and a position calculation unit 19.

Among the three phases of electric rotating machine currents iu, iv, and iw, the U-phase and W-phase electric rotating machine currents iu and iw, which are detected by the current detection means 2, have a relationship represented by expression (1) with the V-phase electric rotating machine current iv, which is not detected by the current detection means 2. Therefore, the adder 16 sums the U-phase and W-phase electric rotating machine currents iu and iw, thereby calculating the V-phase electric rotating machine current iv. It is noted that, as a matter of course, in the case where the current detection means 2 detects the three phases of electric rotating machine currents iu, iv, and iw at the same time, the V-phase electric rotating machine current iv does not need to be calculated.

[Expression 1]

$$iv = -iu - iw \quad (1)$$

The electric rotating machine currents iu, iv, and iw detected as described above are inputted to the position estimation current extractors 17u, 17v, and 17w respectively provided for the electric rotating machine currents iu, iv, and iw, and the position estimation currents iuh, ivh, and iwh having the same frequency components as those of the position estimation voltage instructions Vuh, Vvh, and Vwh are extracted. In this case, the extraction of the position estimation currents iuh, ivh, and iwh is performed by using a band-pass filter or a notch filter. It is noted that the electric rotating machine currents iu, iv, and iw also include signals having the same frequency components as those of noise reduction voltage instructions Vum, Vvm, and Vwm described later, respectively. However, the frequencies of these signals are different from those of the position estimation voltage instructions Vuh, Vvh, and Vwh. Therefore, these signals are removed in the position estimation current extractors 17u, 17v, and 17w, and any problem does not arise for extracting the position estimation currents iuh, ivh, and iwh.

The position estimation currents iuh, ivh, and iwh extracted by the position estimation current extractors 17u, 17v, and 17w as described above are inputted to the current amplitude calculation units 18u, 18v, and 18w respectively provided for the position estimation currents iuh, ivh, and iwh, and the position estimation current amplitudes Iuh, Ivh, and Iwh which are the amplitudes of the position estimation currents iuh, ivh, and iwh are calculated.

A method for calculating the position estimation current amplitudes Iuh, Ivh, and Iwh in this case is not specifically limited. For example, the amplitudes can be calculated by performing Fourier transform or based on the respective autocorrelations obtained by squaring the position estimation currents iuh, ivh, and iwh, based on expression (2).

[Expression 2]

$$\left.\begin{array}{l}Iuh = \sqrt{\dfrac{2}{Tn}\int_0^{Tn} iuh^2\, dt} \\[4pt] Ivh = \sqrt{\dfrac{2}{Tn}\int_0^{Tn} ivh^2\, dt} \\[4pt] Iwh = \sqrt{\dfrac{2}{Tn}\int_0^{Tn} iwh^2\, dt}\end{array}\right\} \quad (2)$$

(Where Tn is the period of the position estimation current)

Next, the position calculation unit 19 calculates the estimated position θL, of the electric rotating machine 1, based on the position estimation current amplitudes Iuh, Ivh, and Iwh calculated by the respective current amplitude calculation units 18u, 18v, and 18w. The details of a method of the calculation will be described below. It is noted that the calculation by the position calculation unit 19 is not limited to the method described below, and any method may be applied as long as the estimated position θL is calculated based on the position estimation current amplitudes Iuh, Ivh, and Iwh.

Figure 3:
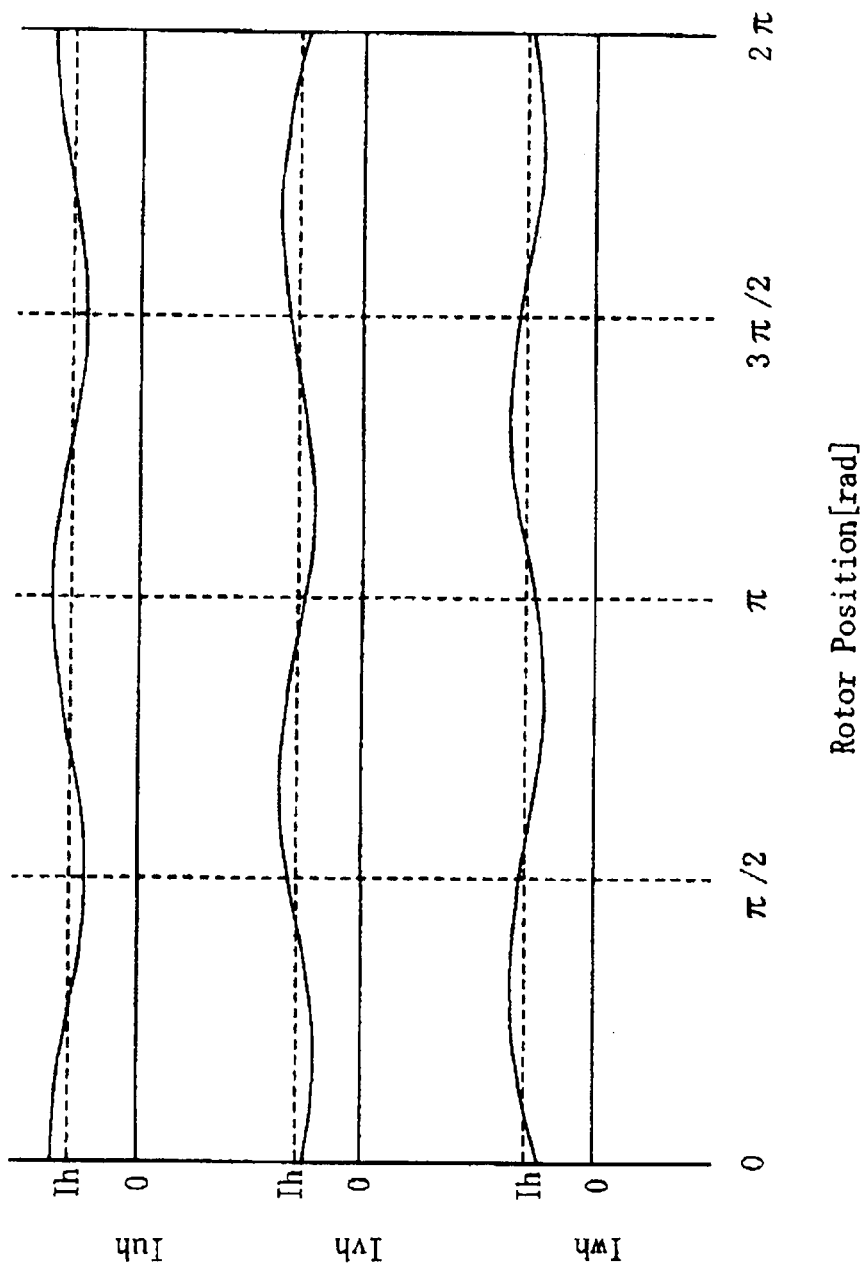
FIG. 3 is a diagram showing the waveforms of position estimation current amplitudes obtained by a current amplitude calculation unit of the control apparatus.

As shown in FIG. 3, an offset Ih has been superimposed on each of the position estimation current amplitudes Iuh, Ivh, and Iwh obtained by the current amplitude calculation units 18u, 18v, and 18w, and the position estimation current amplitudes Iuh, Ivh, and Iwh vary with ½ of the period of the position (electric angle) of the electric rotating machine 1.

Therefore, as shown by expression (3), first, the position calculation unit 19 subtracts the offset Ih from each of the position estimation current amplitudes Iuh, Ivh, and Iwh, thereby calculating position calculation signals dIu, dIv, and dIw. Here, since the position estimation current amplitudes Iuh, Ivh, and Iwh are in three-phase equilibrium, the offset Ih can be calculated as shown by expression (4).

[Expression 3]

$$\left.\begin{array}{l}dIu = Iuh - Ih \\ dIv = Ivh - Ih \\ dIw = Iwh - Ih\end{array}\right\} \quad (3)$$

[Expression 4]

$$Ih = \dfrac{Iuh + Ivh + Iwh}{3} \quad (4)$$

Here, the estimated position θL of the electric rotating machine 1 can be calculated by performing inverse cosine operation for one of the position calculation signals dIu, dIv, and dIw shown in expression (3). However, it is necessary to perform inverse cosine operation and to store an inverse cosine function in advance, resulting in increase of the amount of calculation and the memory. Therefore, this method is not preferable. Embodiment 1 employs a method of calculating the estimated position θL of the electric rotating machine 1 by using linear approximation, without using an inverse cosine function. Hereinafter, this method will be described.

Figure 4:
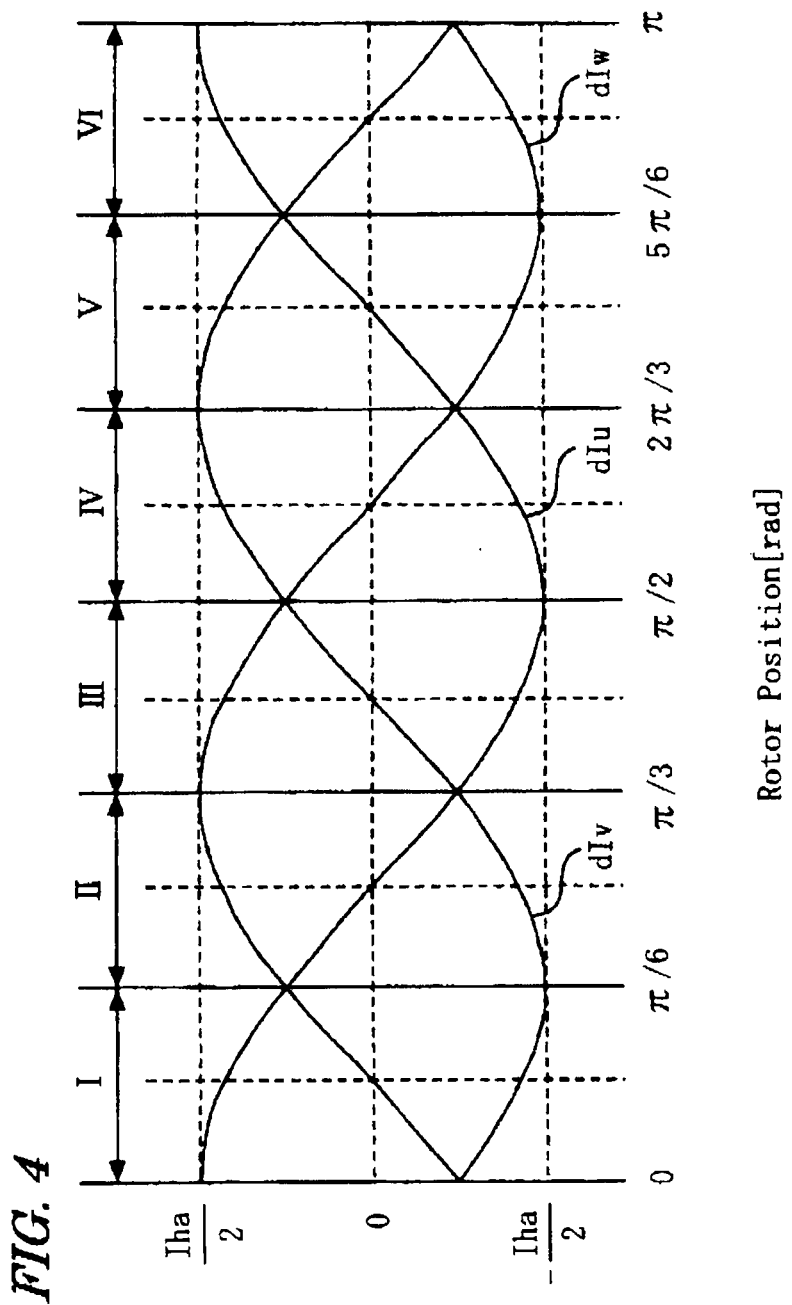
FIG. 4 is a diagram for illustrating the operation of a position calculation unit of the control apparatus.

In the position calculation unit 19, based on the interrelationship among the position calculation signals dIu, dIv, and dIw calculated by expression (3), the position calculation signals dIu, dIv, and dIw are divided into six intervals (I-VI) whose middle positions θM are represented by expression (5), as shown in FIG. 4.

[Expression 5]

$$\theta M = N\frac{\pi}{6} + \frac{\pi}{12}(N = 0, 1, 2 \ldots 5) \quad (5)$$

In each of the intervals (I-VI), one of the position calculation signals dIu, dIv, and dIw that zero-crosses at the middle of the interval is represented by a function of sin or –sin. Since the function of sin or –sin in each of the intervals (I-VI) is considered as a straight line, the signal in each of the intervals (I-VI) is subjected to linear approximation, and a deviation ΔθML between the middle position θM of each of the intervals (I-VI), and the estimated position θL of the electric rotating machine 1 (≈the position θ of the electric rotating machine 1) is calculated based on expression (6). Here, dI_uvw in expression (6) is a value on the vertical axis of each of the position calculation signals dIu, dIv, and dIw as it is when the signal zero-crosses at the middle position θM in each of the intervals (I-VI). In addition, since Iha is the amount of variation of each of the position estimation currents iuh, ivh, and iwh according to the position of the electric rotating machine, (Iha/2) is the amplitude of each of the position calculation signals dIu, dIv, and dIw.

[Expression 6]

$$\Delta\theta ML = \frac{dI\_uvw}{(Iha/2)} \quad (6)$$

It is noted that (Iha/2) may be calculated from the square root of the sum of the squares of the position calculation signals dIu, dIv, and dIw, as shown by expression (7).

[Expression 7]

$$\frac{Iha}{2} = \sqrt{\frac{2(dIu^2 + dIv^2 + dIw^3)}{3}} \quad (7)$$

Then, as shown by expression (8), ΔθML calculated by expression (6) and the middle position θM are summed, whereby the estimated position θL of the electric rotating machine 1 is calculated.

[Expression 8]

$$\theta L = \theta M + \Delta\theta ML \quad (8)$$

The control means 5 includes a drive voltage instruction calculation section 6, a position estimation voltage generator 7, a noise reduction voltage generator 8, a filter 9, and adders 20u, 20v, and 20w.

The adders 20u, 20v, and 20w add, to drive voltage instructions Vu*, Vv*, and Vw* outputted from the drive voltage instruction calculation section 6, the position estimation voltage instructions Vuh, Vvh, and Vwh outputted from the position estimation voltage generator 7, and the noise reduction voltage instructions Vum, Vvm, and Vwm outputted from the noise reduction voltage generator 8 via the filter 9, respectively, and the resultant signals are outputted as the voltage instructions Vup*, Vvp*, and Vwp* to the voltage application means 3.

Therefore, the voltage instructions Vup*, Vvp*, and Vwp*, which are applied to the voltage application means 3, are the drive voltage instructions Vu*, Vv*, and Vw* on which the position estimation voltage instructions Vuh, Vvh, and Vwh and the noise reduction voltage instructions Vum, Vvm, and Vwm have been superimposed, respectively. It is noted that the position estimation voltage instructions Vuh, Vvh, and Vwh and the noise reduction voltage instructions Vum, Vvm, and Vwm will be described later in detail.

The drive voltage instruction calculation section 6 includes two subtractors 10d and 10q, a d-axis current controller 11d, a q-axis current controller 11q, a first coordinate converter 12, a two-phase/three-phase converter 13, a second coordinate converter 14, and a three-phase/two-phase converter 15.

The subtractor 10d, which is one of the subtractors, calculates a deviation Δid between a d-axis current instruction id* for driving the electric rotating machine 1, which is given from the outside of the control means 5, and a current id outputted from the second coordinate converter 14. The d-axis current controller 11d performs proportional-integral control (PI control) such that the deviation Δid becomes zero, thereby calculating a d-axis voltage instruction Vd*.

The subtractor 10q, which is the other one of the subtractors, calculates a deviation Δiq between a q-axis current instruction iq* for driving the electric rotating machine 1, which is given from the outside of the control means 5, and a current iq outputted from the second coordinate converter 14. The q-axis current controller 11q performs proportional-integral control (PI control) such that the deviation Δiq becomes zero, thereby calculating a q-axis voltage instruction Vq*.

The first coordinate converter 12 converts the d-axis current instruction Vd* and the q-axis current instruction Vq* outputted from the d-axis current controller 11d and the q-axis current controller 11q, into voltage instructions Vα* and Vβ* on two axes (α-β axes) at rest, respectively. The two-phase/three-phase converter 13 converts the voltage instructions Vα* and Vβ* outputted from the first coordinate converter 12, into drive voltage instructions Vu*, Vv*, and Vw* in a three-phase AC coordinate system.

The three-phase/two-phase converter 15 converts the electric rotating machine currents iu and iw detected by the current detection means 2, into currents iα and iβ on two axes (α-β axes) at rest. The second coordinate converter 14 converts the currents iα and iβ outputted from the three-phase/two-phase converter 15, into currents id and iq on two rotational axes (d-q axes) rotating in synchronization with the estimated position θL outputted from the position estimation means 4 previously described, and outputs the currents id and iq to the subtractors 10d and 10q, respectively.

The position estimation voltage generator 7 generates, for estimating the position of the rotor of the electric rotating machine 1, the position estimation voltage instructions Vuh, Vvh, and Vwh having frequencies different from those of the drive voltage instructions Vu*, Vv*, and Vw* outputted from the drive voltage instruction calculation section 6. The position estimation voltage instructions Vuh, Vvh, and Vwh may be of any type as long as their frequencies are different from those of the drive voltage instructions Vu*, Vv*, and Vw*. In embodiment 1, the position estimation voltage instructions Vuh, Vvh, and Vwh are three-phase AC position estimation voltage instructions.

Figure 5:
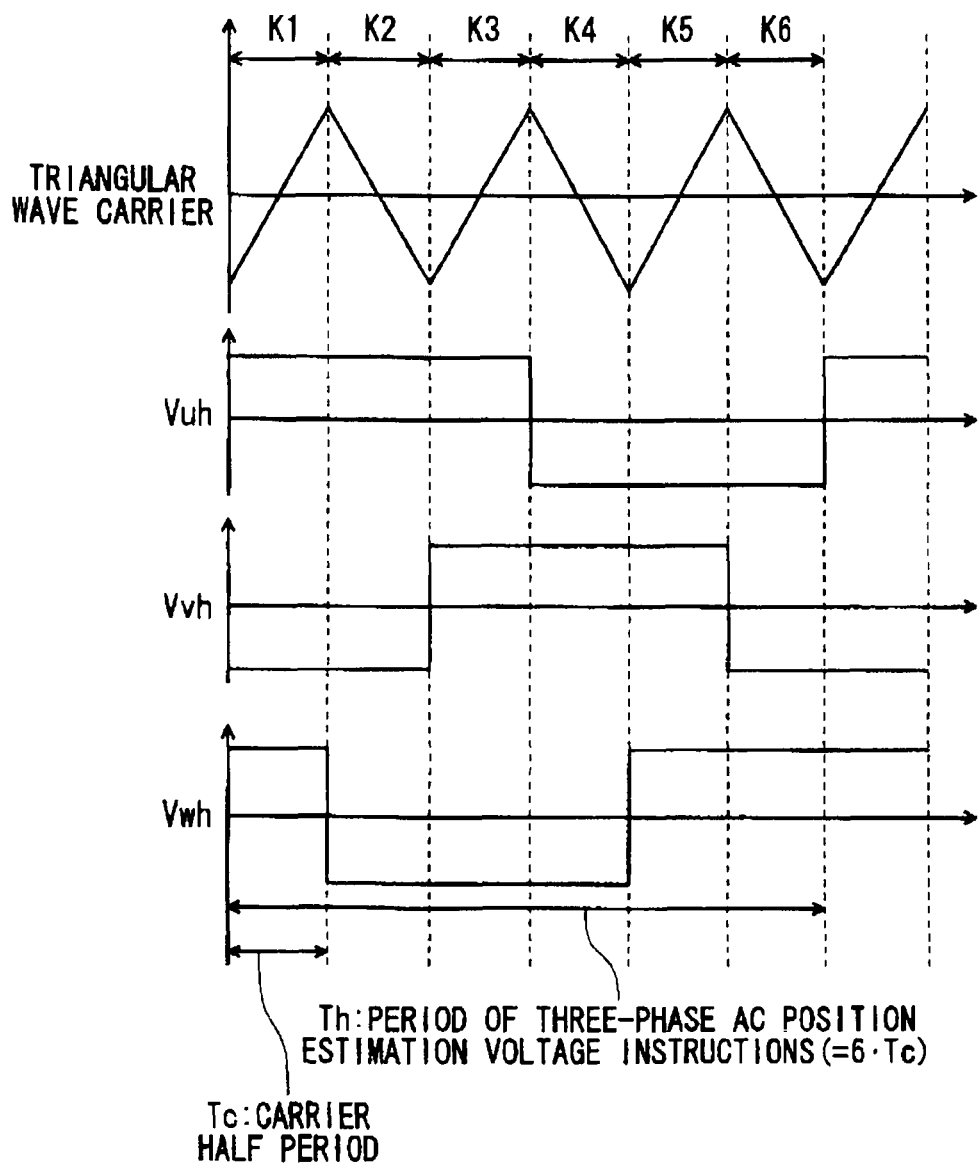
FIG. 5 is a diagram showing the waveforms of position estimation voltage instructions generated by a position estimation voltage generator of the control apparatus.

The three-phase AC position estimation voltage instructions Vuh, Vvh, and Vwh are, for example, shown in FIG. 5. In the case where the voltage application means 3 is a triangular wave comparison PWM inverter, if a half period Tc of a triangular wave carrier used for the triangular wave comparison PWM inverter to perform PWM modulation is one interval, the three-phase AC position estimation voltage instructions are signals whose one period has a length of six intervals (=6*Tc), where the one period is Th. In addition, the position estimation voltage instructions Vuh, Vvh, and Vwh are set such that each of them is displaced by two intervals (=2*Tc) from each other, so that they are in three-phase equilibrium. In this way, if the position estimation voltage instructions Vuh, Vvh, and Vwh are three-phase AC position estimation voltage instructions, it becomes easy to make a pattern as shown in FIG. 5. As a result, the configuration of the position estimation voltage generator 7 can be simplified.

When the position estimation voltage instructions Vuh, Vvh, and Vwh outputted from the position estimation voltage generator 7 are applied to the electric rotating machine 1 by the voltage application means 3, noise occurs from the electric rotating machine 1 along with the application, and a person feels a sense of discomfort from the noise. Therefore, the noise reduction voltage generator 8 outputs the three phases of noise reduction voltage instructions Vum, Vvm, and Vwm in order to reduce such a sense of discomfort. Hereinafter, the details of the noise reduction voltage instructions Vum, Vvm, and Vwm will be described.

Among noises that a person can hear, in comparison between noise having a single frequency component and noise having a plurality of frequency components, there is a feature that a person feels more of a sense of discomfort from the noise having the single frequency component. Therefore, in embodiment 1, the noise reduction voltage generator 8 generates the three phases of noise reduction voltage instructions Vum, Vvm, and Vwm having frequencies different from those of the drive voltage instructions Vu*, Vv*, and Vw* and from those of the position estimation voltage instructions Vuh, Vvh, and Vwh, and the adders 20u, 20v, and 20w add the noise reduction voltage instructions Vum, Vvm, and Vwm to the drive voltage instructions Vu*, Vv*, and Vw* and the position estimation voltage instructions Vuh, Vvh, and Vwh, respectively. Then, the voltage application means 3 applies, to the electric rotating machine 1, voltages for drive control, based on the voltage instructions Vup*, Vvp*, and Vwp* obtained by the addition.

As a result, noise occurring from the electric rotating machine 1 includes a frequency component based on the position estimation voltage instructions Vuh, Vvh, and Vwh, and a frequency component based on the noise reduction voltage instructions Vum, Vvm, and Vwm in a mixed manner. Therefore, a sense of discomfort that a person feels can be reduced in comparison with the case where the noise has a single frequency component.

Especially, it is preferred that the frequencies of the noise reduction voltage instructions Vum, Vvm, and Vwm are set to temporally vary instead of setting the frequencies at constant values, because in this case, the frequencies of the noise reduction voltage instructions Vum, Vvm, and Vwm include various frequencies, and a sense of discomfort due to the noise occurring from the electric rotating machine 1 can be further reduced.

For example, if each of the noise reduction voltage instructions Vum, Vvm, and Vwm is set as an FM modulation wave represented by expression (9) in which the amplitude is $A_f$, the center frequency is $\omega_n$, and the phase varies as $m_f * \sin(\omega_m * t)$, the frequencies of the noise reduction voltage instructions Vum, Vvm, and Vwm temporally vary. As a result, also the noise occurring from the electric rotating machine 1 temporally varies in frequency, whereby various frequencies are included in the noise. Therefore, a sense of discomfort that a person feels from the noise can be further reduced.

[Expression 9]

$$A_f \cos(\omega_n t + m_f \sin(\omega_m t)) \qquad (9)$$

The filter 9 provided between the noise reduction voltage generator 8 and the adders 20u, 20v, and 20w removes the same frequency components as those of the position estimation voltage instructions Vuh, Vvh, and Vwh and frequency components in the vicinity thereof so that such frequency components are not included in the noise reduction voltage instructions Vum, Vvm, and Vwm. For example, a notch filter is applied to the filter 9.

For example, in the case where the noise reduction voltage instructions Vum, Vvm, and Vwm are the FM modulation waves represented by expression (9), if the frequency band of the FM modulation wave partly overlaps with the frequencies of the position estimation voltage instructions Vuh, Vvh, and Vwh, the noise reduction voltage instructions Vum, Vvm, and Vwm might have an adverse influence on the position estimation voltage instructions Vuh, Vvh, and Vwh, and the accuracy of position estimation might be deteriorated. Especially, when frequency components included in the noise reduction voltage instructions Vum, Vvm, and Vwm are the same as those of the position estimation voltage instructions Vuh, Vvh, and Vwh, and the phases of the frequency components are opposite to the phases of the position estimation voltage instructions Vuh, Vvh, and Vwh, the noise reduction voltage instructions Vum, Vvm, and Vwm cancel out the position estimation voltage instructions Vuh, Vvh, and Vwh. Then, the signal levels of the position estimation voltage instructions Vuh, Vvh, and Vwh become small or zero, and a trouble that the accuracy of position estimation is deteriorated occurs.

Therefore, the filter 9 removes the same frequency components as those of the position estimation voltage instructions Vuh, Vvh, and Vwh and frequency components in the vicinity thereof so that such frequency components are not included in the noise reduction voltage instructions Vum, Vvm, and Vwm, thereby preventing the accuracy of position estimation from being deteriorated.

Figure 6:
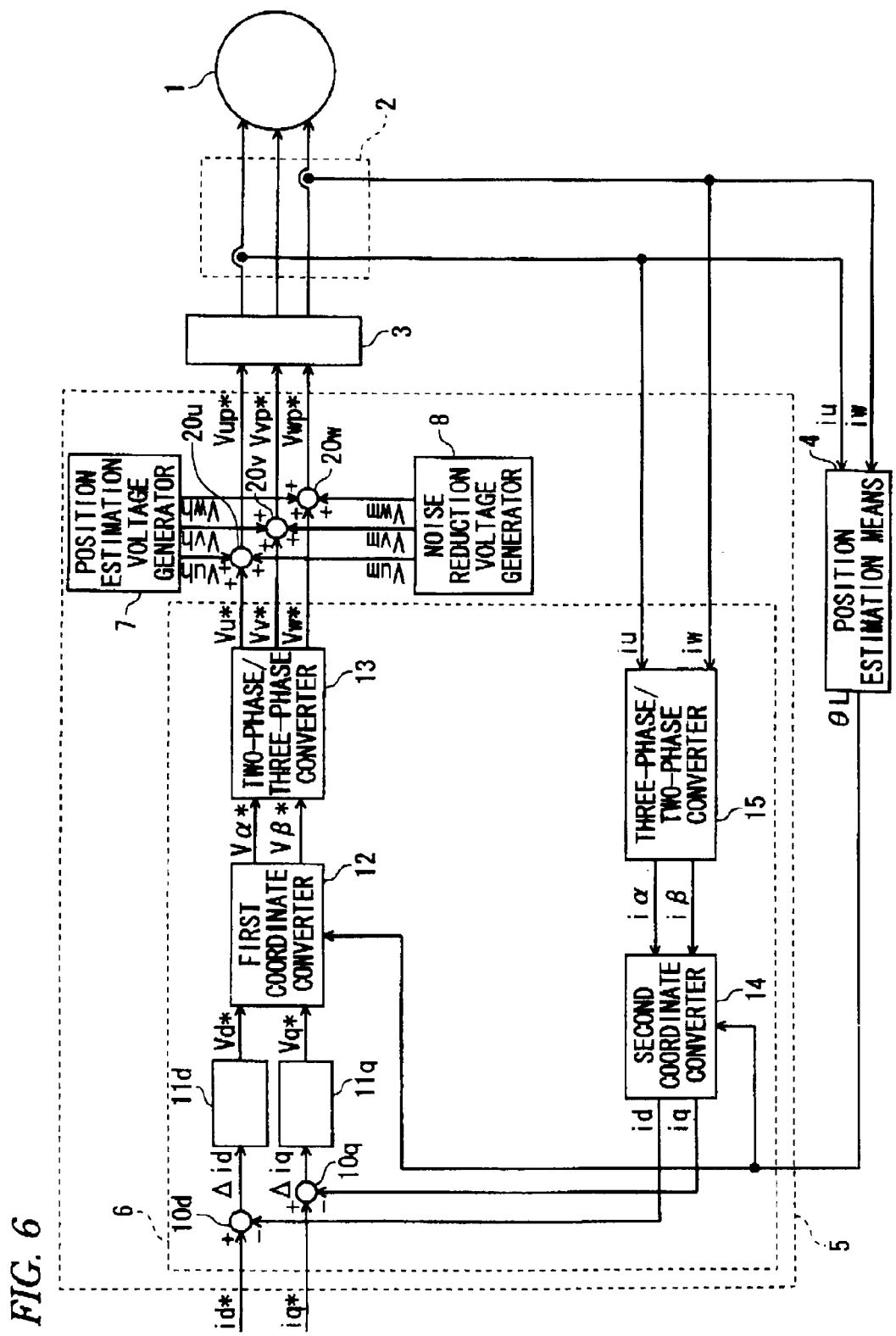
FIG. 6 is a diagram showing a modification of the configuration of the control apparatus for the electric rotating machine, according to embodiment 1 of the present invention.

It is noted that if there is no possibility that the same frequency components as those of the position estimation voltage instructions Vuh, Vvh, and Vwh or frequency components in the vicinity thereof are included in the noise reduction voltage instructions Vum, Vvm, and Vwm, the filter 9 may be omitted as shown in FIG. 6.

As described above, in embodiment 1, when the position estimation voltage instructions Vuh, Vvh, and Vwh are applied to the electric rotating machine 1 for realizing change from rotational position sensor style to sensorless style, the noise reduction voltage instructions Vum, Vvm, and Vwm having frequency components different from those of the position estimation voltage instructions Vuh, Vvh, and Vwh are added at the same time. Therefore, the noise occurring from the electric rotating machine 1 includes frequency components different from those of the position estimation voltage instructions Vuh, Vvh, and Vwh, and a sense of discomfort that a person feels can be reduced in comparison with the case where the noise has a single frequency component.

In addition, the frequencies of the position estimation voltage instructions Vuh, Vvh, and Vwh are always constant though the noise includes a plurality of frequency components in a mixed manner. Therefore, in comparison with the case where the frequencies of the position estimation voltage instructions Vuh, Vvh, and Vwh vary in a random manner as in the conventional technique, the position estimation currents iuh, ivh, and iwh can be accurately extracted from the electric rotating machine currents, and as a result, a high accuracy of position estimation is ensured.

In addition, since the filter 9 removes in advance the same frequency components as those of the position estimation voltage instructions Vuh, Vvh, and Vwh and frequency components in the vicinity thereof so that such frequency components are not included in the noise reduction voltage instructions Vum, Vvm, and Vwm, it is possible to prevent the noise reduction voltage instructions Vum, Vvm, and Vwm from having an adverse influence on the position estimation voltage instructions Vuh, Vvh, and Vwh.

Embodiment 2

Figure 7:
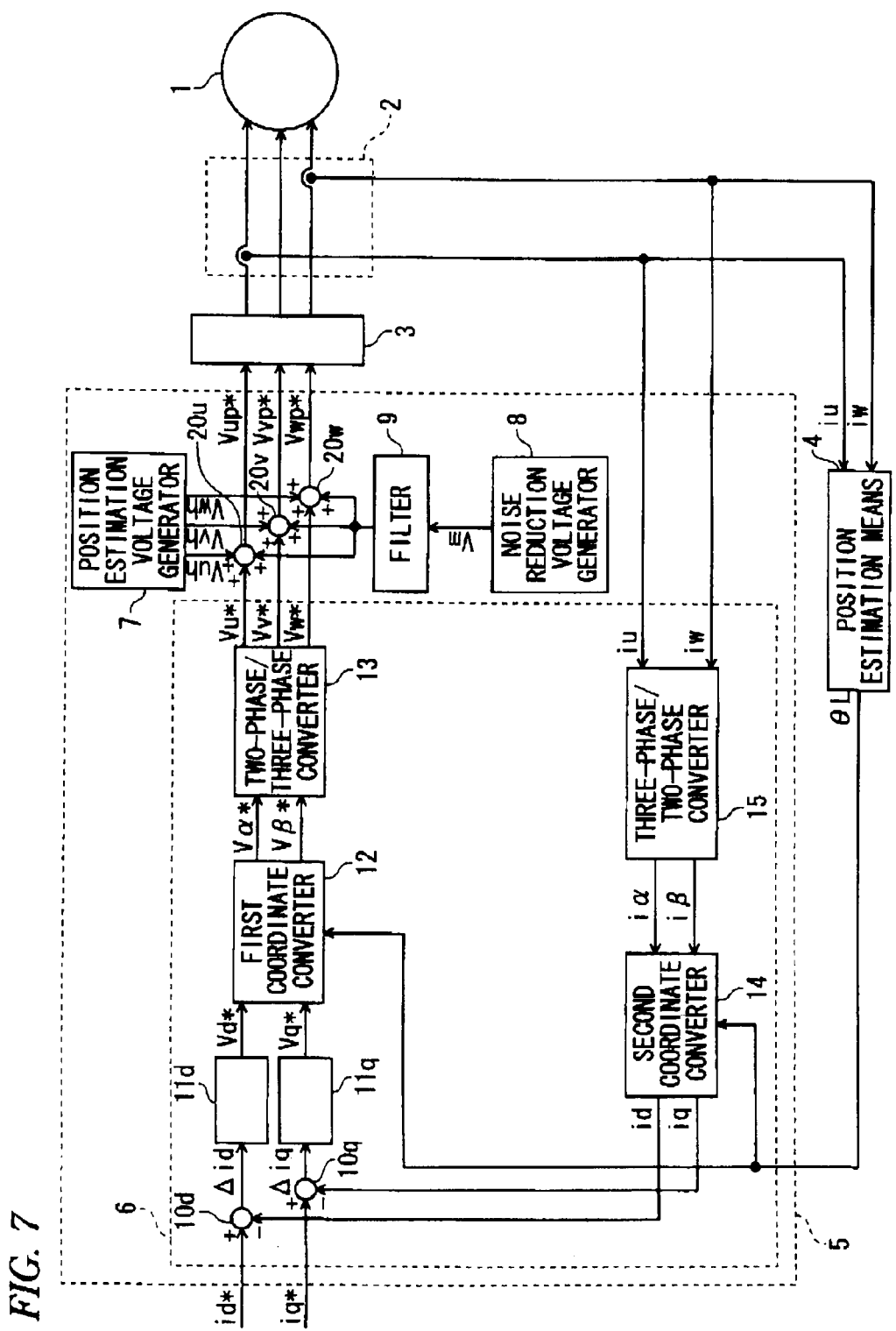
FIG. 7 is a diagram showing the configuration of a control apparatus for the electric rotating machine, according to embodiment 2 of the present invention.

FIG. 7 is a diagram showing a configuration of a control apparatus for the electric rotating machine, according to embodiment 2 of the present invention. Components that correspond to or are the same as those in embodiment 1 shown in FIG. 1 are denoted by the same reference numerals. It is noted that, in FIG. 7, the configurations other than that of the noise reduction voltage generator 8 of the control means 5 are the same as in embodiment 1. Therefore, the description of the configurations other than that of the noise reduction voltage generator 8 will be omitted here.

In embodiment 1, the noise reduction voltage generator 8 generates the three phases of noise reduction voltage instructions Vum, Vvm, and Vwm, whereas in embodiment 2, the noise reduction voltage generator 8 generates a single noise reduction voltage instruction Vm including an FM modulation wave whose frequency temporally varies or an AM modulation wave whose amplitude temporally varies, and the noise reduction voltage instruction Vm that has passed the filter 9 is divided into three signals to be given to the respective adders 20u, 20v, and 20w.

Figure 8:
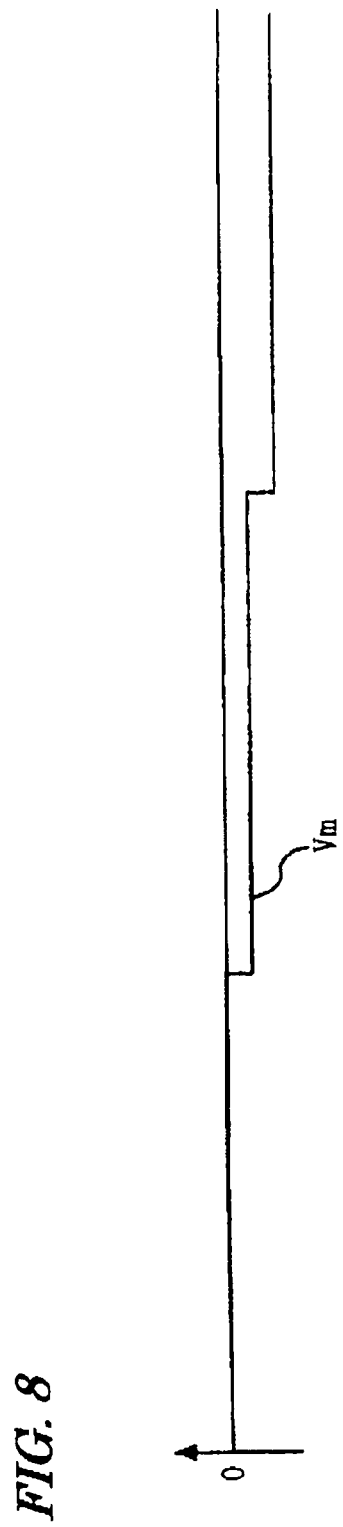
FIG. 8 is a diagram showing an example of the waveform of a noise reduction voltage instruction generated by a noise reduction voltage generator.

That is, in embodiment 2, the noise reduction voltage instruction Vm generated by the noise reduction voltage generator 8 is an FM modulation wave whose frequency temporally varies as represented by expression (9), an AM modulation wave represented by expression (10) in which the angular frequency is $\omega_b$ and the amplitude temporally varies as $(A_{a1}+A_{a2}\ast\sin \omega_a t)$, or an AM modulation wave whose amplitude periodically varies in a step-like fashion as shown in FIG. 8.

[Expression 10]

$$(A_{a1}+A_{a2}\cdot\sin \omega_a t)\cdot\sin \omega_b t \quad (10)$$

Here, in the case where the identical noise reduction voltage instruction Vm is superimposed on the U-phase, V-phase, and W-phase voltage instructions Vup*, Vvp*, and Vwp*, the line voltages among the U-phase, V-phase, and W-phase voltage instructions Vup*, Vvp*, and Vwp* do not vary. Therefore, it might appear that any sound having the same frequency component as that of the noise reduction voltage instruction Vm does not occur from the electric rotating machine 1.

However, in the case where the voltage application means 3 includes a carrier comparison PWM inverter, a drive control voltage subjected to PWM modulation based on the resultant value obtained by the comparison between a triangular or saw-tooth carrier wave and the voltage instructions Vup*, Vvp*, and Vwp* inputted to the voltage application means 3 is outputted to the electric rotating machine 1. Therefore, if the noise reduction voltage instruction Vum including an FM modulation wave whose frequency temporally varies or an AM modulation wave whose amplitude temporally varies is superimposed on the voltage instructions Vup*, Vvp*, and Vwp* as described above, a switching timing of switching on/off each of switching devices included in the carrier comparison PWM inverter varies. Owing to the variation of the switching timing, noise including a plurality of frequency components occurs from the electric rotating machine 1. Thus, noise occurring along with the application of the position estimation voltage instructions Vuh, Vvh, and Vwh can be suppressed so as not to be conspicuous, and as a result, a sense of discomfort that a person feels from the noise can be reduced. Hereinafter, the details thereof will be described.

Figure 9:
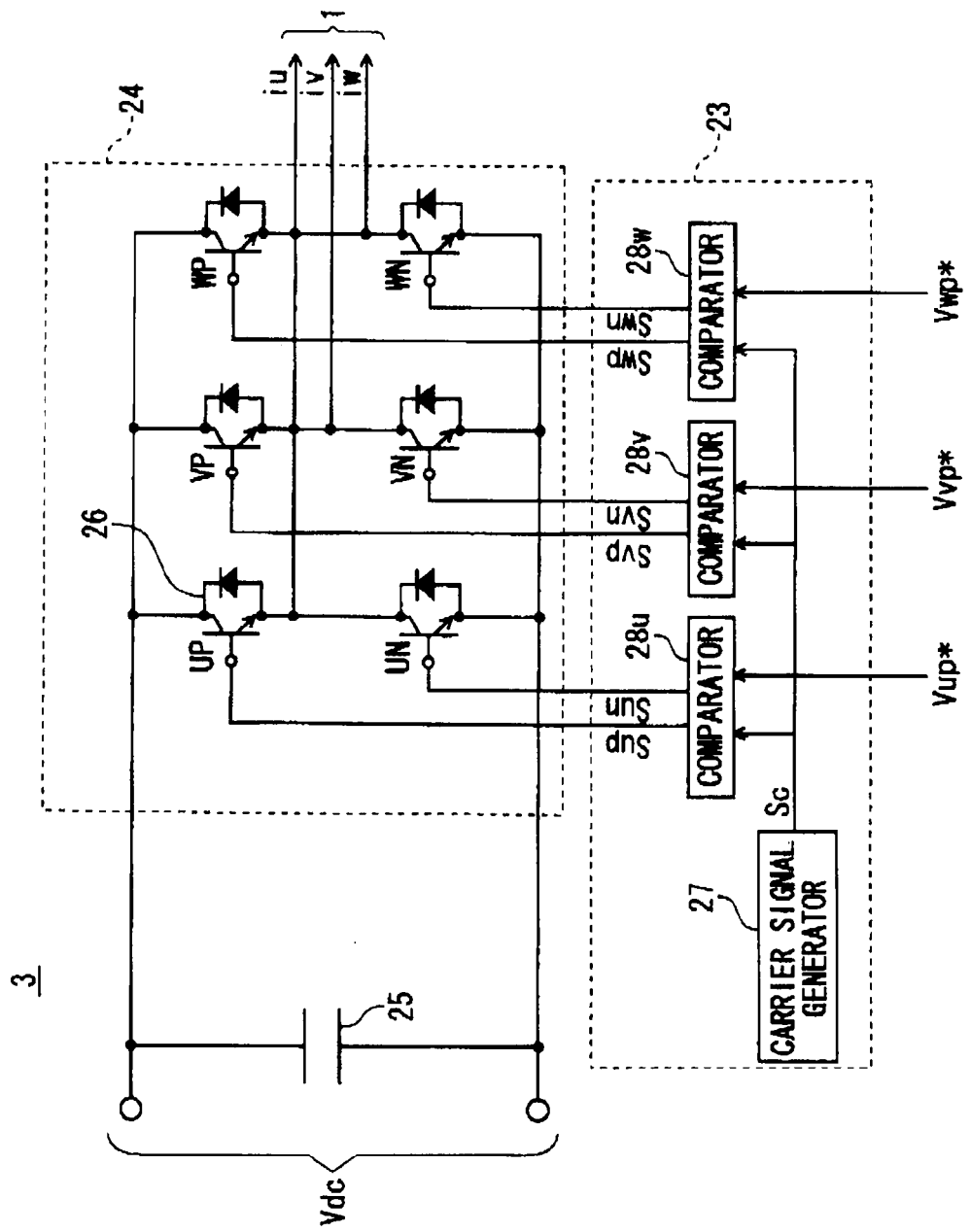
FIG. 9 is a diagram showing a specific example of the configuration of a voltage application means of the control apparatus.

FIG. 9 is a diagram showing a configuration of the voltage application means 3 functioning as a carrier comparison PWM inverter.

The voltage application means 3 includes a switching signal calculation section 23, a power conversion section 24, and a smoothing capacitor 25.

Here, the switching signal calculation section 23 includes one carrier signal generator 27, and comparators 28u, 28v, and 28w for three phases. The carrier signal generator 27 generates a carrier signal Sc such as a triangular wave or a saw-tooth wave.

In addition, the comparators 28u, 28v, and 28w compare the carrier signal Sc outputted from the carrier signal generator 27 with the voltage instructions Vup*, Vvp*, and Vwp* outputted from the control means 5, respectively, and output switching signals Sup, Sun, Svp, Svn, Swp, and Swn for switching on/off the respective switching devices 26 of the power conversion section 24. For example, the comparators 28u, 28v, and 28w compare the carrier signal Sc of a triangular wave with the voltage instructions Vup*, Vvp*, and Vwp*, respectively. Then, if the level of each of the voltage instructions Vup*, Vvp*, and Vwp* is larger than that of the carrier signal Sc, each of the comparators 28u, 28v, and 28w outputs a switching signal that switches on the corresponding switching device 26, and if the level of each of the voltage instructions Vup*, Vvp*, and Vwp* is smaller than that of the carrier signal Sc, each of the comparators 28u, 28v, and 28w outputs a switching signal that switches off the corresponding switching device 26.

The power conversion section 24 includes the six switching devices 26 (UP, UN, VP, VN, WP, and WN) which are semiconductor switches such as IGBTs, for example. The six switching devices 26 are switched on/off by the respective switching signals Sup, Sun, Svp, Svn, Swp, and Swn given by the switching signal calculation section 23, whereby the power conversion section 24 converts a DC voltage Vdc given by an external DC voltage supply of the voltage application means 3, into an AC voltage, and applies the AC voltage to the electric rotating machine 1.

Figure 10:
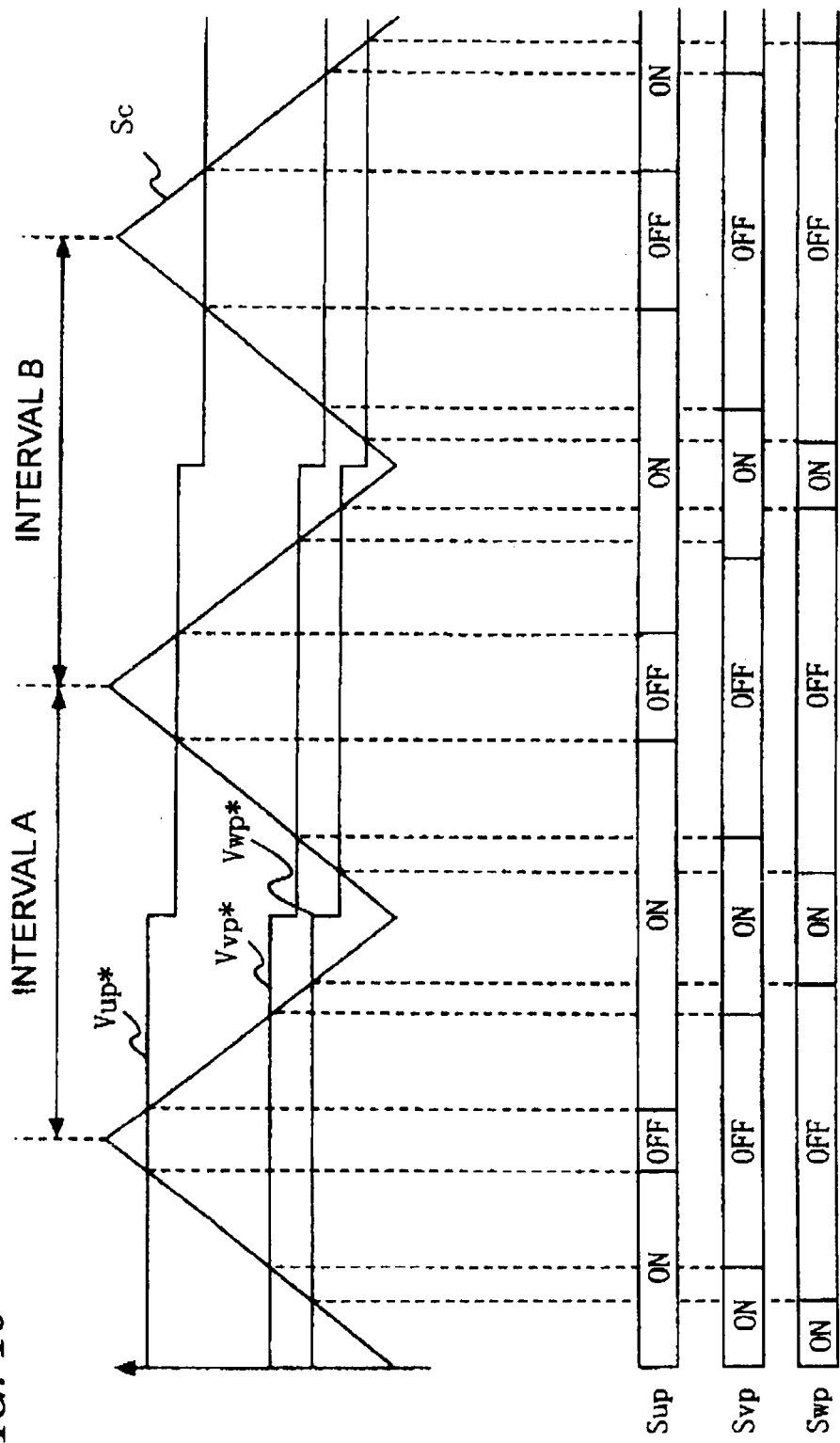
FIG. 10 is a diagram for illustrating the operation in the case where voltage instructions to which the noise reduction voltage instructions have been added are given to the voltage application means of the control apparatus.
Figure 11:
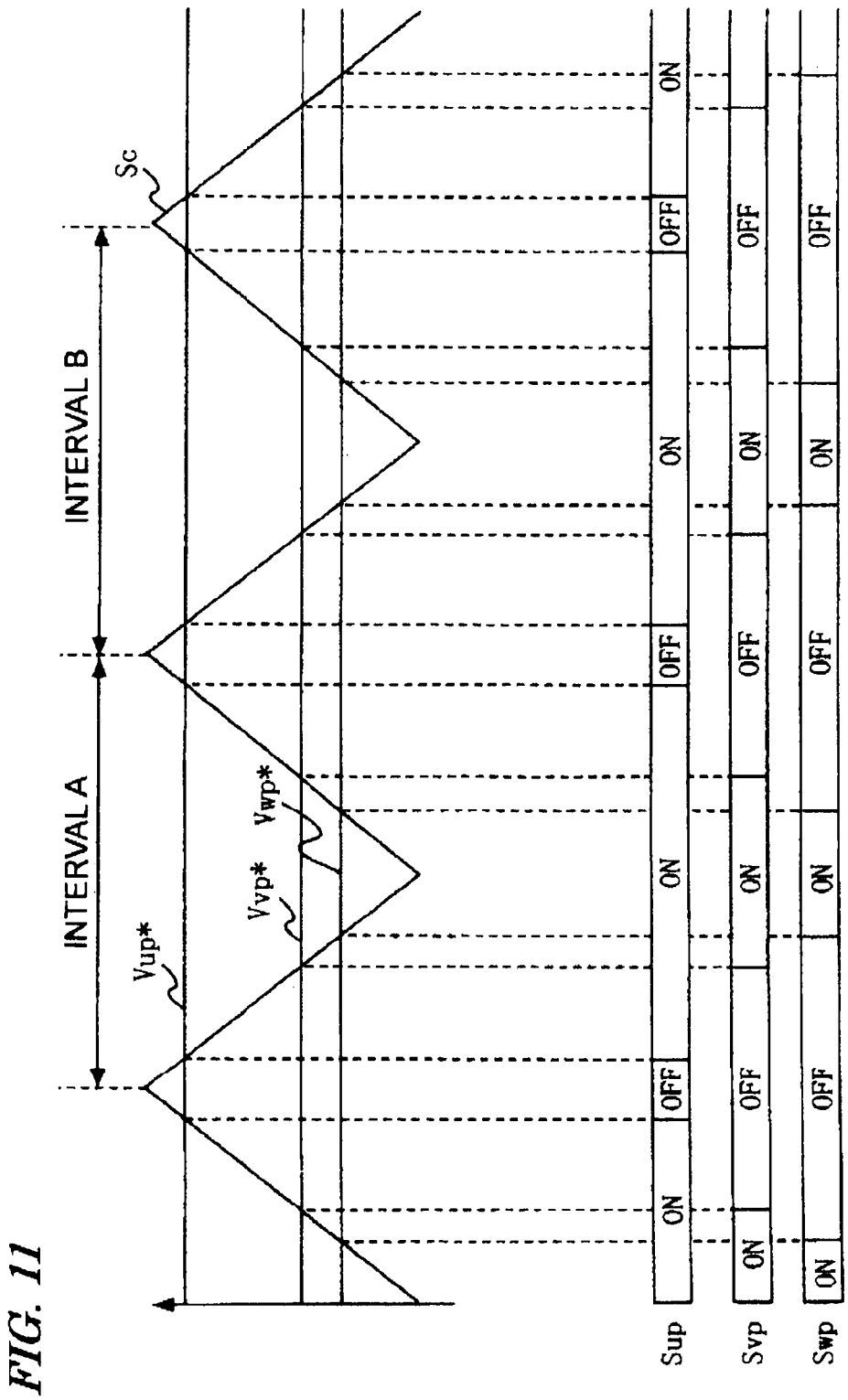
FIG. 11 is a diagram for illustrating the operation in the case where voltage instructions to which the noise reduction voltage instructions are not added are given to the voltage application means of the control apparatus.

FIG. 10 is a waveform diagram schematically showing the relationship among the voltage instructions Vup*, Vvp*, and Vwp*, the carrier signal Sc of a triangular wave, and the three switching signals Sup, Svp, and Swp in the case where noise reduction voltage instruction Vm including an AM modulation wave whose amplitude periodically varies in a step-like fashion as shown in FIG. 8 has been added to the voltage instructions Vup*, Vvp*, and Vwp*. FIG. 11 is a waveform diagram schematically showing the relationship among the voltage instructions Vup*, Vvp*, and Vwp*, the carrier signal Sc of a triangular wave, and the three switching signals Sup, Svp, and Swp in the case where the noise reduction voltage instruction Vm as shown in FIG. 8 is not added to the voltage instructions Vup*, Vvp*, and Vwp*.

It is noted that in FIG. 10 and FIG. 11, although the voltage instructions Vup*, Vvp*, and Vwp* are actually sine wave signals, they are represented in a linear fashion because their frequencies are lower than that of the carrier signal Sc and the noise reduction voltage instruction Vm. In addition, although the position estimation voltage instructions Vuh, Vvh, and Vwh have been superimposed on the voltage instructions Vup*, Vvp*, and Vwp*, the position estimation voltage instructions Vuh, Vvh, and Vwh are not shown in the drawings because the operation of switch timings of the switching devices 26 will be mainly described here.

In the case where the voltage instructions Vup*, Vvp*, and Vwp* to which the noise reduction voltage instruction Vm is not added are given to the respective switching devices 26, all the switching timings of the switching devices 26 in an interval A are respectively the same as those in an interval B, as shown in FIG. 11.

On the other hand, in the case where the voltage instructions Vup*, Vvp*, and Vwp* to which the noise reduction voltage instruction Vm has been added are given to the respective switching devices 26, the line voltages are constant but the switching timings of the switching devices 26 in an interval A are different from those in an interval B, as is obvious from FIG. 10.

As described above, in the case where the noise reduction voltage instruction Vm including an AM modulation wave whose amplitude temporally varies or an AM modulation wave whose amplitude temporally varies in a step-like fashion has been added, the switching timings of switching on/off the switching devices 26 vary. Then, owing to the variation of the switching timings, noise including a plurality of frequency components occurs from the electric rotating machine 1. Thus, noise occurring along with the application of the position estimation voltage instructions Vuh, Vvh, and Vwh is suppressed so as not to be conspicuous, and as a result, a sense of discomfort that a person feels from the noise can be reduced.

In addition, as in embodiment 1, since the filter 9 removes in advance the same frequency components as those of the position estimation voltage instructions Vuh, Vvh, and Vwh and frequency components in the vicinity thereof so that such frequency components are not included in the noise reduction voltage instruction Vm, it is possible to prevent the noise reduction voltage instruction Vm from having an adverse influence on the position estimation voltage instructions Vuh, Vvh, and Vwh. It is noted that if the same frequency components as those of the position estimation voltage instructions Vuh, Vvh, and Vwh or frequency components in the vicinity thereof are not included in the noise reduction voltage instruction Vm, the filter 9 may be omitted.

As described above, in embodiment 2, since the electric rotating machine 1 is driven by the voltage instructions Vup*, Vvp*, and Vwp* to which the single noise reduction voltage instruction Vm including an AM modulation wave whose amplitude temporally varies or an AM modulation wave whose amplitude temporally varies in a step-like fashion has been added, the switching timings of the switching devices 26 included in the voltage application means 3 vary, and owing to the variation, noise including a plurality of frequency components occurs from the electric rotating machine 1. Therefore, noise occurring along with the application of the position estimation voltage instructions Vuh, Vvh, and Vwh can be suppressed so as not to be conspicuous, and as a result, a sense of discomfort that a person feels from the noise can be reduced.

In addition, in embodiment 1, since the three phases of noise reduction voltage instructions Vum, Vvm, and Vwm are added, electric rotating machine currents having the same frequency components as those of the noise reduction voltage instructions Vum, Vvm, and Vwm flow in the electric rotating machine 1, and the electric rotating machine currents become losses. On the other hand, in embodiment 2, since the single noise reduction voltage instruction Vm is commonly applied for the three phases, the line voltages do not vary by the addition of the noise reduction voltage instruction Vm. Therefore, a electric rotating machine current having the same frequency component as that of the noise reduction voltage instruction Vm does not flow in the electric rotating machine 1. Therefore, the configuration of the noise reduction voltage generator 8 can be simplified, and occurrence of a loss due to the addition of the noise reduction voltage instruction Vm can be prevented.

Embodiment 3

Figure 12:
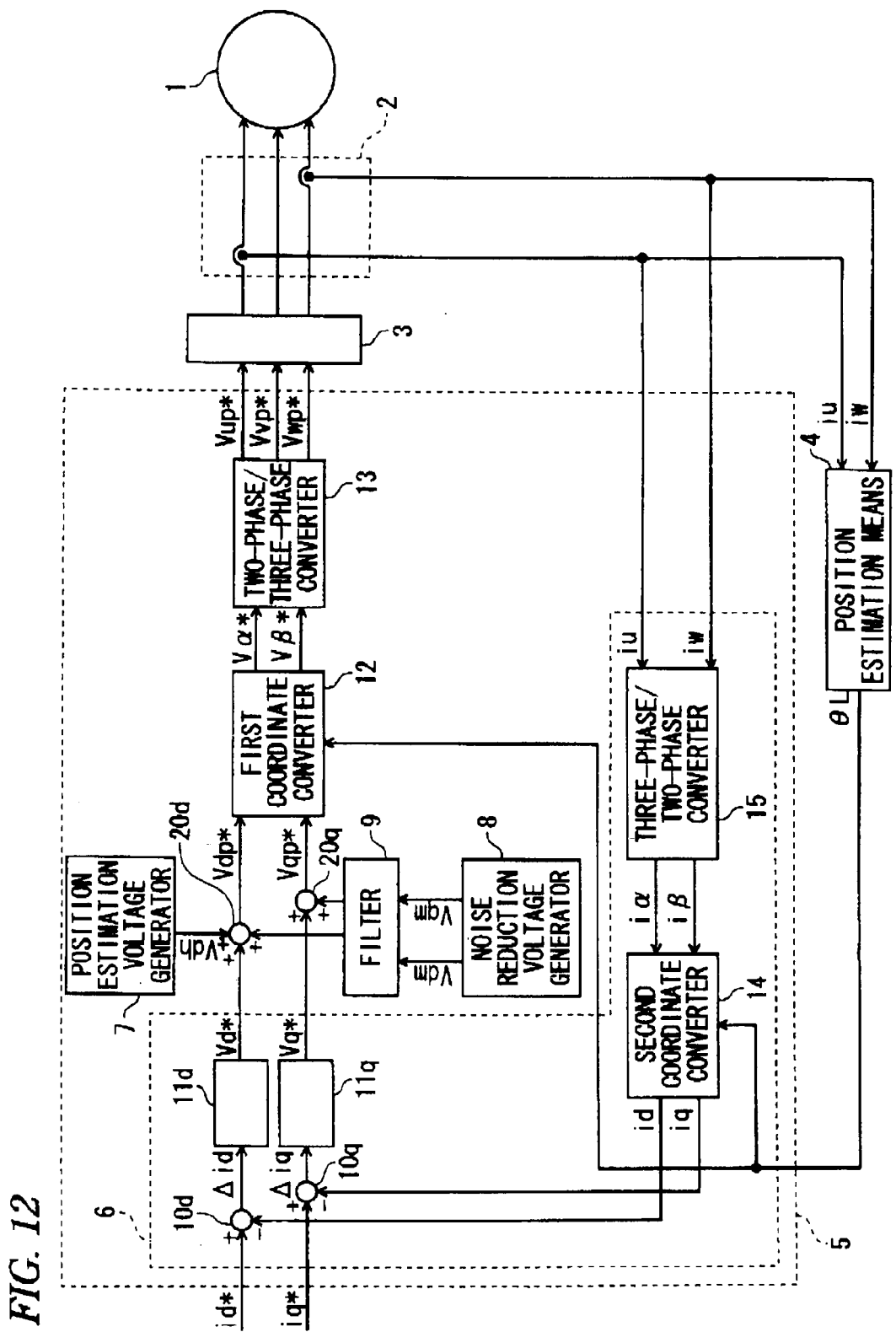
FIG. 12 is a diagram showing the configuration of a control apparatus for the electric rotating machine, according to embodiment 3 of the present invention.

FIG. 12 is a diagram showing the configuration of a control apparatus for the electric rotating machine, according to embodiment 3 of the present invention. Components that correspond to or are the same as those in embodiment 1 shown in FIG. 1 are denoted by the same reference numerals. It is noted that, in FIG. 12, the configurations other than those of the position estimation means 4 and the control means 5 are the same as in embodiment 1. Therefore, the description of the configurations other than those of the position estimation means 4 and the control means 5 will be omitted here.

The control means 5 includes the drive voltage instruction calculation section 6, the position estimation voltage generator 7, the noise reduction voltage generator 8, the filter 9, the first coordinate converter 12, and the two-phase/three-phase converter 13.

The drive voltage instruction calculation section 6 includes the two subtractors 10d and 10q, the d-axis current controller 11d, the q-axis current controller 11q, the second coordinate converter 14, and the three-phase/two-phase converter 15. In the drive voltage instruction calculation section 6, the configurations of the two subtractors 10d and 10q, the d-axis current controller 11d, the q-axis current controller 11q, the second coordinate converter 14, and the three-phase/two-phase converter 15 are the same as in embodiment 1. Therefore, the description thereof will be omitted here.

In embodiments 1 and 2, in order to estimate the position of the rotor of the electric rotating machine 1, the position estimation voltage generator 7 generates the three-phase AC position estimation voltage instructions Vuh, Vvh, and Vwh, whereas in embodiment 3, the position estimation voltage generator 7 generates a position estimation voltage instruction Vdh that is an alternating voltage and that has a frequency different from that of the drive voltage instruction Vd* outputted from the drive voltage instruction calculation section 6.

In this case, the position estimation voltage instruction Vdh may be of any type as long as the frequency thereof is different from that of the drive voltage instruction Vd*. In embodiment 3, the position estimation voltage instruction Vdh that is an alternating voltage is added to only the d-axis voltage instruction Vd* among the d-axis voltage instruction Vd* and the q-axis voltage instruction Vq*. As a result, torque ripple occurring when the position estimation voltage instruction Vdh is applied to the electric rotating machine 1 can be suppressed, which is advantageous.

The noise reduction voltage generator 8 outputs, for example, two phases of noise reduction voltage instructions Vdm and Vqm such as the FM modulation wave represented by expression (9), similarly to the noise reduction voltage generator 8 of embodiment 1. Then, the filter 9 removes in advance frequency components, included in the noise reduction voltage instructions Vdm and Vqm, that are the same as that of the position estimation voltage instruction Vdh and frequency components in the vicinity thereof, and the resultant noise reduction voltage instructions Vdm and Vqm are given to adders 20*d* and 20*q*. It is noted that if the same frequency components as that of the position estimation voltage instruction Vdh or frequency components in the vicinity thereof are not included in the noise reduction voltage instructions Vdm and Vqm outputted from the noise reduction voltage generator 8, the filter 9 may be omitted.

The adder 20*d* which is one of the adders 20*d* and 20*q* adds the position estimation voltage instruction Vdh, and the position estimation voltage instruction Vdm that has passed the filter 9, to the d-axis voltage instruction Vd* outputted from the drive voltage instruction calculation section 6, and outputs the resultant instruction as a voltage instruction Vdp* to the first coordinate converter 12. In addition, the adder 20*d* which is the other one of the adders 20*d* and 20*q* adds the noise reduction voltage instruction Vqm that has passed the filter 9, to the q-axis voltage instruction Vq* outputted from the drive voltage instruction calculation section 6, and outputs the resultant instruction as a voltage instruction Vqp* to the first coordinate converter 12.

The first coordinate converter 12 converts the voltage instructions Vdp* and Vqp* outputted from the adders 20*d* and 20*q*, into voltage instructions Vα* and Vβ* on two axes (α-β axes) at rest, respectively. Subsequently, the two-phase/three-phase converter 13 converts the voltage instructions Vα* and Vβ* outputted from the first coordinate converter 12, into the voltage instructions Vup*, Vvp*, and Vwp* in a three-phase AC coordinate system. Then, the voltage application means 3 applies, to the electric rotating machine 1, voltages for drive control, based on the voltage instructions Vup*, Vvp*, and Vwp*.

As a result, noise occurring from the electric rotating machine 1 includes frequency components based on the position estimation voltage instruction Vdh, and frequency components based on the noise reduction voltage instructions Vdm and Vqm in a mixed manner. Therefore, a sense of discomfort that a person feels can be reduced in comparison with the case where the noise has a single frequency component.

The position estimation means 4 extracts currents having the same frequency components as that of the position estimation voltage instruction Vdh, which is an alternating voltage, outputted from the position estimation voltage generator 7, from the electric rotating machine currents iu and iw detected by the current detection means 2, and outputs the estimated position θL, based on the extracted currents, by using, for example, a known technique disclosed in U.S. Pat. No. 3,312,472 or U.S. Pat. No. 3,707,528.

In this case, the frequency of the position estimation voltage instruction Vdh, which is an alternating voltage, is different from that of the d-axis voltage instruction Vd*. In addition, the same frequency components as that of the position estimation voltage instruction Vdh and frequency components in the vicinity thereof are removed in advance by the filter 9 from the noise reduction voltage instructions Vdm and Vqm which are added by the adders 20*d* and 20*q*. Therefore, the accuracy of the estimated position θL outputted from the position estimation means 4 is not deteriorated.

As described above, in embodiment 3, when the position estimation voltage generator 7 outputs the position estimation voltage instruction Vdh which is an alternating voltage, the noise reduction voltage generator 8 outputs the noise reduction voltage instructions Vdm and Vqm at the same time, and the adders 20*d* and 20*q* generate the voltage instructions Vdp* and Vqp* to which the noise reduction voltage instructions Vdm and Vqm have been added, as in embodiments 1 and 2. Therefore, noises occurring from the electric rotating machine 1 also include noise occurring along with the addition of the noise reduction voltage instructions Vdm and Vqm, in addition to noise occurring along with the application of the position estimation voltage instruction Vdh. As a result, noise due to the position estimation voltage instruction Vdh is not conspicuous, and a sense of discomfort that a person feels from the noise can be reduced.

Embodiment 4

Figure 13:
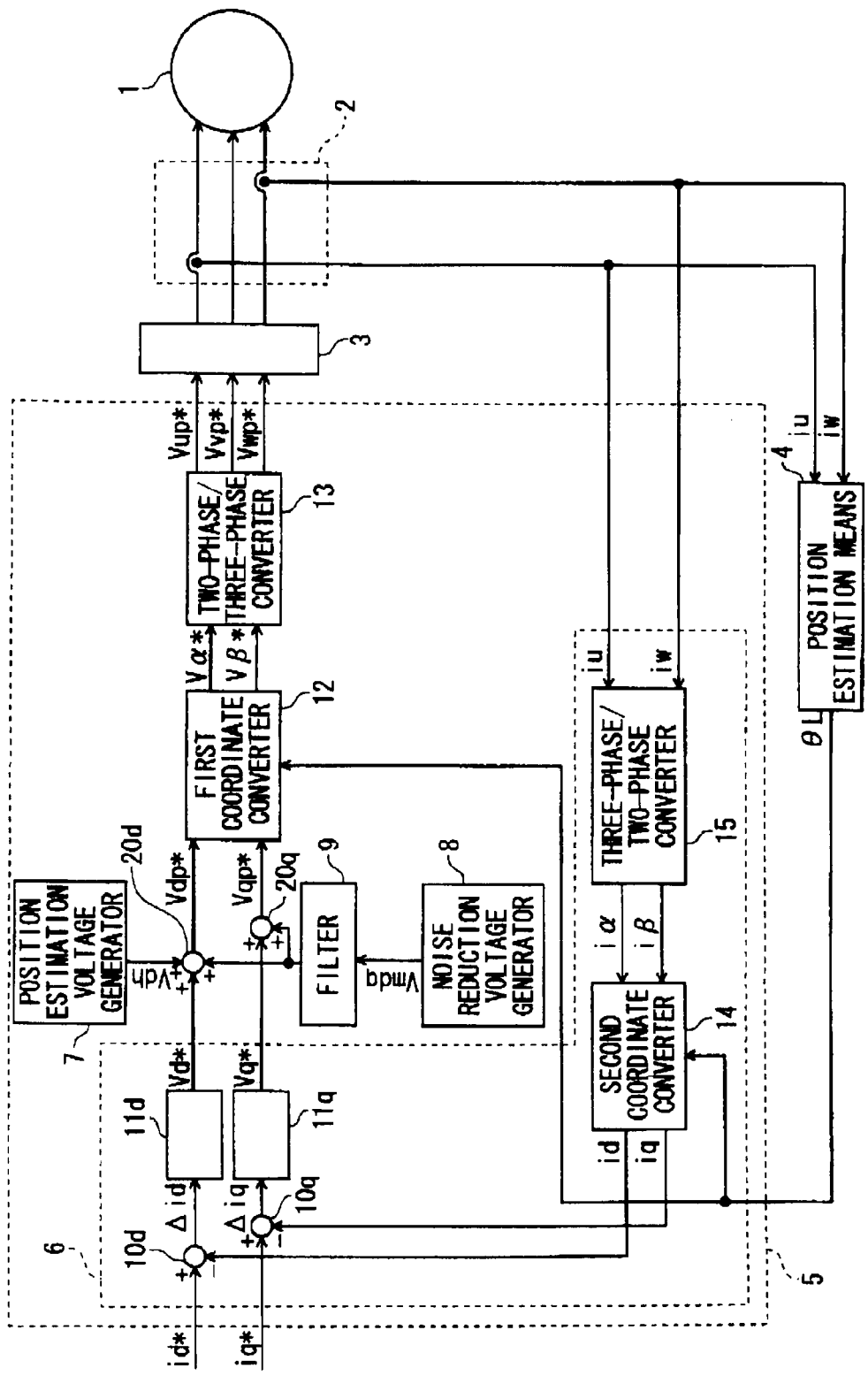
FIG. 13 is a diagram showing the configuration of a control apparatus for the electric rotating machine, according to embodiment 4 of the present invention.

FIG. 13 is a diagram showing the configuration of a control apparatus for the electric rotating machine, according to embodiment 4 of the present invention. Components that correspond to or are the same as those in embodiment 3 shown in FIG. 12 are denoted by the same reference numerals. It is noted that, in FIG. 13, the configurations other than that of the noise reduction voltage generator 8 of the control means 5 are the same as in embodiment 3. Therefore, the description of the configurations other than that of the noise reduction voltage generator 8 will be omitted here.

In embodiment 3, the noise reduction voltage generator 8 generates the two phases of noise reduction voltage instructions Vdm and Vqm, whereas in embodiment 4, the noise reduction voltage generator 8 generates a single noise reduction voltage instruction Vmdq including an FM modulation wave whose frequency temporally varies as represented by expression (9) or an AM modulation wave whose amplitude temporally varies as represented by expression (10), as in embodiment 2.

The noise reduction voltage instruction Vmdq is inputted to the filter 9, whereby the same frequency component as that of the position estimation voltage instruction Vdh and frequency components in the vicinity thereof are removed in advance, and then the resultant signal is divided into two signals to be given to the respective adders 20*d* and 20*q*. The adders 20*d* and 20*q* add the divided two signals to the drive voltage instructions Vd* and Vq*, and output the resultant signals as the voltage instructions Vdp* and Vqp*, respectively. It is noted that, also in this case, if the same frequency component as that of the position estimation voltage instruction Vdh or frequency components in the vicinity thereof are not included in the noise reduction voltage instruction Vmdq outputted from the noise reduction voltage generator 8, the filter 9 may be omitted.

Thus, the noise reduction voltage instruction Vmdq does not have an adverse influence on the position estimation voltage instruction Vdh, and the switching timings of the switching devices included in the voltage application means 3 temporally vary. Therefore, noise including a plurality of frequency components according to the switching timings occurs from the electric rotating machine 1. As a result, noise occurring along with the application of the position estimation voltage instruction Vdh to the electric rotating machine 1 is not conspicuous, and a sense of discomfort that a person feels can be reduced.

As described above, in embodiment 4, when the position estimation voltage instruction Vdh, which is an alternating voltage, generated by the position estimation voltage generator 7 is added to the d-axis voltage instruction Vd*, the noise reduction voltage generator 8 outputs the single noise reduction voltage instruction Vmdq including an AM modulation wave whose amplitude temporally varies or an AM modulation wave whose amplitude temporally varies in a step-like fashion. Therefore, the switching timings of the switching devices included in the voltage application means 3 vary, and noise including a plurality of frequency components occurs from the electric rotating machine 1, as in embodiment 2. Therefore, noise occurring from the electric rotating machine 1 along with the application of the position estimation voltage instruction Vdh can be suppressed so as not to be conspicuous, and as a result, a sense of discomfort that a person feels from the noise can be reduced. In addition, in embodiment 4, since the single noise reduction voltage instruction Vm is applied, the configuration of the noise reduction voltage generator 8 can be simplified, and occurrence of a loss due to the addition of the noise reduction voltage instruction Vm can be prevented, in comparison with embodiment 3.

INDUSTRIAL APPLICABILITY

In embodiments 1 to 4, a synchronous machine of embedded-magnet type is used as the electric rotating machine 1. However, the control apparatus for the electric rotating machine, according to the present invention, is also applicable to synchronous machines of other types such as synchronous-reluctance type.

The invention claimed is:

1. A control apparatus for an electric rotating machine for performing drive control of the electric rotating machine, the control apparatus comprising:
   current detection means for detecting electric rotating machine currents flowing in the electric rotating machine;
   position estimation means for estimating the position of a rotor of the electric rotating machine, based on the electric rotating machine current detected by the current detection means;
   control means for outputting voltage instructions, based on the electric rotating machine current detected by the current detection means and information about the position of the rotor estimated by the position estimation means; and
   voltage application means for applying a voltage for drive control, to the electric rotating machine, based on the voltage instructions outputted from the control means;
   the control means including a drive voltage instruction calculation section for calculating drive voltage instructions for driving the electric rotating machine,
   the control means including a position estimation voltage generator for outputting position estimation voltage instructions for estimating the position of the rotor of the electric rotating machine,
   the control means including a noise reduction voltage generator for outputting noise reduction voltage instructions having frequencies different from those of the drive voltage instructions and from those of the position estimation voltage instructions, and
   the control means including adders for adding the position estimation voltage instructions and the noise reduction voltage instructions to the drive voltage instructions, and outputting the resultant signal as the voltage instructions to the voltage application means.

2. The control apparatus for the electric rotating machine according to claim 1, wherein
   the noise reduction voltage generator outputs a single noise reduction voltage instruction, and
   the adders divide the single noise reduction voltage instruction into a plurality of signals, and add the plurality of signals to the drive voltage instructions for respective phases.

3. The control apparatus for the electric rotating machine according to claim 1, wherein a filter for removing the same frequency component as that of the position estimation voltage instructions from the noise reduction voltage instructions is provided between the noise reduction voltage generator and the adders.

4. The control apparatus for the electric rotating machine according to claim 1, wherein the noise reduction voltage generator outputs the noise reduction voltage instructions whose frequencies temporally vary.

5. The control apparatus for the electric rotating machine according to claim 1, wherein the noise reduction voltage generator outputs the noise reduction voltage instructions whose amplitudes temporally vary.

6. The control apparatus for the electric rotating machine according to claim 1, wherein the position estimation voltage generator outputs three-phase AC position estimation voltage instructions as the position estimation voltage instructions for estimating the position of the electric rotating machine.

7. The control apparatus for the electric rotating machine according to claim 1, wherein the position estimation voltage generator outputs position estimation voltage instructions that are alternating voltage, as the position estimation voltage instructions for estimating the position of the electric rotating machine.

8. The control apparatus for the electric rotating machine according to claim 1, wherein the position estimation means estimates the position of the rotor of the electric rotating machine, based on a current having the same frequency component as that of the position estimation voltage instructions, the current being included in the electric rotating machine current.

* * * * *